United States Patent
Nara et al.

(10) Patent No.: US 10,063,772 B2
(45) Date of Patent: Aug. 28, 2018

(54) IMAGE PROCESSING APPARATUS THAT SENDS IMAGE TO EXTERNAL APPARATUS

(71) Applicant: CASIO COMPUTER CO., LTD., Shibuya-ku, Tokyo (JP)

(72) Inventors: Kazuya Nara, Tokyo (JP); Jun Hosoda, Saitama (JP); Yuji Kuriyama, Tokyo (JP); Yoshinori Tomidokoro, Tokyo (JP); Toshiya Kiso, Tokyo (JP); Takuya Yamada, Tokyo (JP); Daisuke Otani, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 188 days.

(21) Appl. No.: 15/009,756

(22) Filed: Jan. 28, 2016

(65) Prior Publication Data

US 2016/0277676 A1     Sep. 22, 2016

(30) Foreign Application Priority Data

Mar. 19, 2015  (JP) ................................ 2015-056248
Aug. 7, 2015   (JP) ................................ 2015-157368

(51) Int. Cl.
*H04N 5/232*    (2006.01)
*H04N 5/911*    (2006.01)
(Continued)

(52) U.S. Cl.
CPC ..... *H04N 5/23229* (2013.01); *H04N 1/00127* (2013.01); *H04N 5/911* (2013.01); *H04N 7/15* (2013.01)

(58) Field of Classification Search
CPC ........... H04N 5/23229; H04N 1/00127; H04N 5/23203; H04N 5/23219; H04N 5/772; H04N 7/147; H04N 7/15
See application file for complete search history.

(56) References Cited

U.S. PATENT DOCUMENTS 8,886,176 B2 * 11/2014 Luna ..................... H04W 12/06
                                                          455/422.1
9,596,303 B2 *  3/2017 Simmons .......... G06F 17/30233
(Continued)

FOREIGN PATENT DOCUMENTS

CN    103685726 A    3/2014
JP    2002342465 A   11/2002
(Continued)

OTHER PUBLICATIONS

Chinese Office Action dated Mar. 7, 2018 (and an English translation thereof) issued in counterpart Chinese Application No. 201610146186.0.

*Primary Examiner* — Hung Lam
(74) *Attorney, Agent, or Firm* — Holtz, Holtz & Volek PC

(57) ABSTRACT

An image processing apparatus sends an image to an external apparatus. The image processing apparatus includes a communication control unit, and a processing unit. The communication control unit, when an image is photographed by an image capture unit, controls the first communication unit to automatically send the photographed image to an external apparatus, and the communication control unit, controls the first communication unit to manually send the photographed image which is stored and is selected by a user to an external apparatus. The processing unit, when sending an image to an external apparatus, processes an image sent based on whether sending the image is the automatic sending or the manual sending.

16 Claims, 5 Drawing Sheets

(51) Int. Cl.
*H04N 1/00* (2006.01)
*H04N 7/15* (2006.01)

(56) References Cited

U.S. PATENT DOCUMENTS

| | | | |
|---|---|---|---|
| 9,712,986 B2 * | 7/2017 | Fiatal | .................. H04W 4/20 |
| 2009/0147141 A1 * | 6/2009 | Lee | .................. G06K 9/00221 |
| | | | 348/576 |
| 2010/0211651 A1 * | 8/2010 | Guedalia | ............... H04L 65/601 |
| | | | 709/217 |
| 2014/0085488 A1 | 3/2014 | Song | |
| 2015/0146021 A1 | 5/2015 | Nishiguchi | |
| 2017/0322551 A1 * | 11/2017 | Zang | .................. G05D 1/0038 |

FOREIGN PATENT DOCUMENTS

| | | | | |
|---|---|---|---|---|
| JP | 3988075 B2 | | 10/2007 | |
| JP | 2011-055293 | * | 3/2011 | ............. H04N 1/387 |
| JP | 2014131328 A | | 7/2014 | |
| JP | 2015104015 A | | 6/2015 | |

* cited by examiner

FIG. 3

IMAGE SENDING SETTING

| SENDING METHOD | IMAGE TYPE | IMAGE SIZE | | SENT/UNSENT | PROCESSED/UNPROCESSED | PROCESSING CHANGE CONDITION |
|---|---|---|---|---|---|---|
| AUTOMATIC | STATIC IMAGE | MORE THAN 3 MB | — | SENT | PROCESSED (UNPROCESSED) | #1 |
| | | NO MORE THAN 3 MB | — | SENT | UNPROCESSED | |
| | MOVING IMAGE | MORE THAN 100 MB | — | UNSENT | — | |
| | | NO MORE THAN 100 MB | MORE THAN HD SIZE | SENT | PROCESSED (UNPROCESSED) | #2 |
| | | | NO MORE THAN HD SIZE | SENT | UNPROCESSED | |
| MANUAL | STATIC IMAGE | MORE THAN 500 MB | — | SENT | UNPROCESSED (PROCESSED) | #3 |
| | MOVING IMAGE | — | — | UNSENT | — | |
| | | NO MORE THAN 500 MB | — | SENT | UNPROCESSED (PROCESSED) | #3 |

1 REGISTERED FACE INCLUDED IN IMAGE/IMAGE PHOTOGRAPHED UNDER SPECIFIC CONDITION/STATIC IMAGE DURING PHOTOGRAPHING MOVING IMAGE/NUMBER OF TIMES OF AUTOMATIC SENDING: LOW

2 REGISTERED FACE INCLUDED IN IMAGE/IMAGE PHOTOGRAPHED UNDER SPECIFIC CONDITION/NUMBER OF TIMES OF AUTOMATIC SENDING: LOW

3 SELECTED NUMBER OF IMAGES/TOTAL DATA VOLUME: LARGE

IMAGE PROCESSING APPARATUS THAT SENDS IMAGE TO EXTERNAL APPARATUS

This application claims the benefit of priority of Japanese Patent Application No. 2015-056248 filed on Mar. 19, 2015 and Japanese Patent Application No. 2015-157368 filed on Aug. 7, 2015 the entire disclosure of which, including the description, claims, drawings, and abstract, is incorporated herein by reference in its entirety.

BACKGROUND OF THE INVENTION

Field of the Invention

The present invention relates to an image processing apparatus and an image processing method.

Related Art

Conventionally, an image photographed by a digital camera is utilized not only by an apparatus which photographs the image, but also by another external apparatus. For example, in Japanese Unexamined Patent Application, Publication No. 2002-342465, a technology is disclosed which sends an image to an external apparatus once the image is photographed for use at the external apparatus.

SUMMARY OF THE INVENTION

An image processing apparatus that sends an image to an external apparatus, comprising: a processor that: controls a communication section to automatically send a photographed image to an external apparatus when the image is photographed by an image capture section, controls the communication section to manually send a photographed image which is stored and is selected by a user, to an external apparatus, and processes, when sending an image to the external apparatus, an image sent based on whether sending of the image is the automatic sending or the manual sending.

An image processing apparatus that sends an image photographed by an image capture section to an external apparatus, comprising: a processor acquires a characteristic of an image to be sent to the external apparatus, when a communication section sending an image to the external apparatus, and processes an image to be sent based on a characteristic of an image acquired.

An image processing method executed by an image processing apparatus that sends an image photographed by an image capture section to an external apparatus, the method comprising: first sending processing of controlling a communication section to automatically send a photographed image to an external apparatus when the image is photographed by the image capture section; second sending processing of controlling a communication section to manually send a photographed image which is stored and is selected by a user, to an external apparatus; and image processing of, when a communication section sending an image to the external apparatus, processing an image to be sent based on whether sending of the image is automatic sending in the first sending processing or manual sending in the second sending processing.

An image processing method executed by an image processing apparatus that sends an image photographed by an image capture section to an external apparatus, the method comprising: characteristic acquisition processing of acquiring a characteristic of an image to be sent to the external apparatus; and a image processing of, when a communication section sending an image to the external apparatus, processing an image sent based on a characteristic of an image acquired in the characteristic acquisition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

By considering the present application in combination with the following detailed descriptions with the following drawings, deeper understandings of the present application can be obtained.

FIG. 3 is a view showing corresponding relationships among condition relating to image sending, sending, and processed/unprocessed, of the present embodiment;

DETAILED DESCRIPTION OF THE INVENTION

Figure 1:
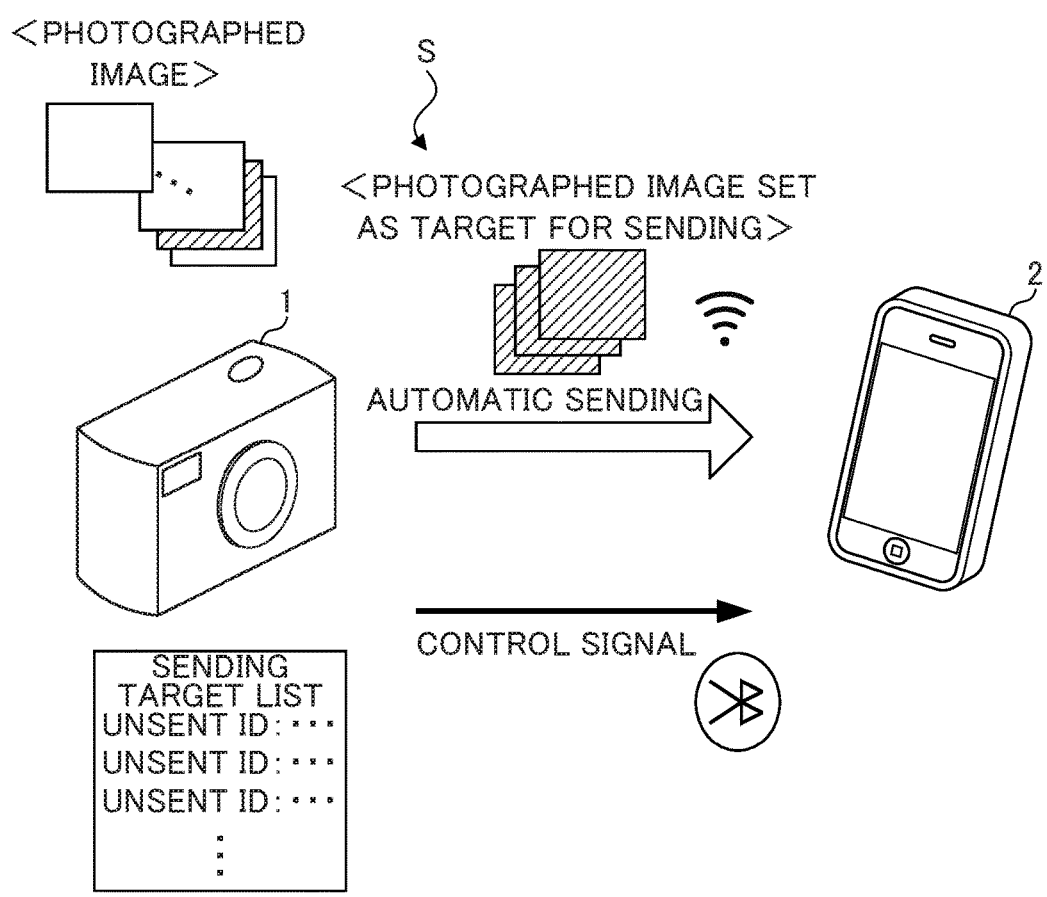
FIG. 1 is a system configuration diagram illustrating a system configuration of an image transfer system according to one embodiment of the present invention.

FIG. 1 is a system configuration diagram illustrating a system configuration of an image transfer system according to one embodiment of the present invention.

As illustrated in FIG. 1, the image sending system S includes an image processing apparatus 1 and a mobile terminal apparatus 2.

The image sending system S has a function of automatically sending an image photographed by the image processing apparatus 1 (hereinafter, referred to as "photographed image") to the mobile terminal apparatus 2 which is an external apparatus, after photographing.

In the present embodiment, the image processing apparatus 1 sends only a photographed image which is set as a sending target (hatched in the drawings) among photographed images to the mobile terminal apparatus 2. The image processing apparatus 1 retains a sending target list which manages the sending targets of photographed image, and a sending status using an ID of the photographed image and sends the photographed image by referencing the sending target list. In other words, the image processing apparatus 1 sends a corresponding photographed image to the mobile terminal apparatus 2 based on an unsent ID stored in the sending target list. It should be noted that the setting to a sending target is performed based on the setting at the time of photographing (automatic sending setting: ON/OFF), for example.

Furthermore, in the image sending system S of the present embodiment, the image processing apparatus 1 uses two communication methods when sending an image. In other words, an image is sent by way of the two communication methods of a wireless communication method (hereinafter, referred to as "first communication method" which is high-speed and adapted for sending and receiving a file and a wireless communication method (hereinafter, referred to as "second communication method") which is low-speed but low electric power consumption and suited for full-time connection.

It should be noted that, in the present embodiment, the first communication method uses a communication method based on a communication standard of Wi-Fi (Wireless Fidelity) among wireless LAN (Local Area Network). Furthermore, it should be noted that, in the present embodiment, the second communication method uses a communication method based on a communication standard of BLE (Bluetooth low energy/Bluetooth LE ("Bluetooth" is a registered trademark) (Trademark).

A case of performing the automatic sending function of a photographed image in the image sending system S of the present embodiment is performed in a state of the communication between the image processing apparatus 1 and the mobile terminal apparatus 2 being established by way of BLE, which is the second communication method (full-time connection state). In other words, the automatic sending function of a photographed image is performed on the premise that the connection is established by BLE, which is the second communication method, between the image processing apparatus 1 and the mobile terminal apparatus 2.

More specifically, an instruction (control signal) is outputted from the image processing apparatus 1 to the mobile terminal apparatus 2 to establish a communication by Wi-Fi, which is the first communication method, via the communication by way of the second communication method so that the communication by way of Wi-Fi, which is the first communication method, between the image processing apparatus 1 and the mobile terminal apparatus 2. It should be noted that, in the present embodiment, a communication by way of a one-by-one direct communication between the image processing apparatus 1 and the mobile terminal apparatus 2 is established with the image processing apparatus 1 set as a main device in Wi-Fi and with the mobile terminal apparatus 2 set as a sub device in Wi-Fi, which is the first communication method.

Then, an image is send by way of the first communication method from the image processing apparatus 1 to the mobile terminal apparatus 2. With such a configuration, it becomes possible to receive an image by way of the first communication method without performing an operation at the mobile terminal apparatus 2.

Furthermore, the mobile terminal apparatus 2 stores and manages a photographed image received from the image processing apparatus 1 for example and utilizes the photographed image at an external apparatus by way of uploading to a cloud server for the purpose of sharing images with another external apparatus.

Figure 2:
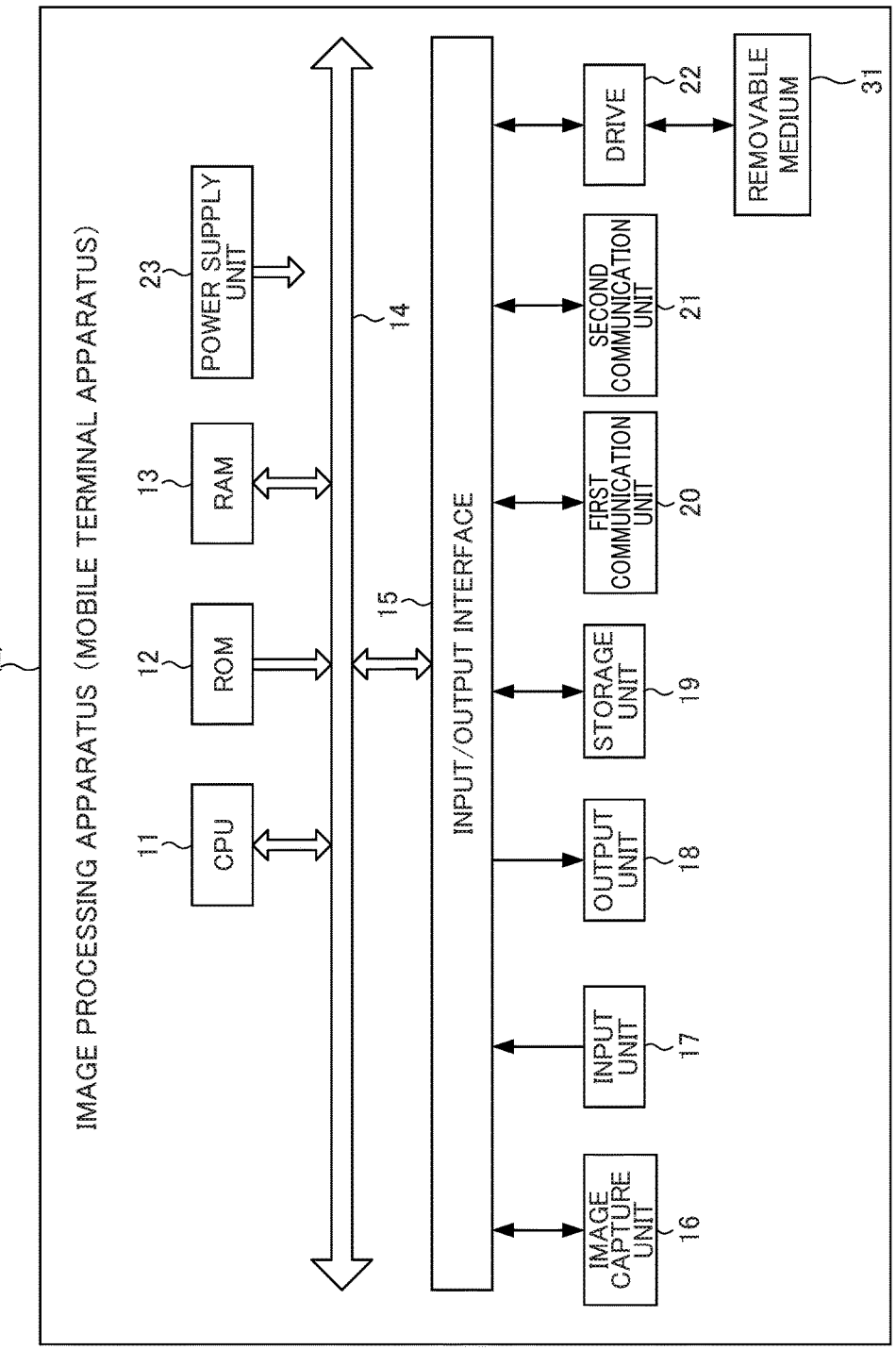
FIG. 2 is a block diagram illustrating a hardware configuration of an image processing apparatus and a mobile terminal apparatus according to an embodiment of the present invention.

FIG. 2 is a block diagram showing the hardware configuration of the image processing apparatus 1 and the mobile terminal apparatus 2 according to an embodiment of the present invention.

The image processing apparatus 1 is configured as, for example, a digital camera.

The image processing apparatus 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a first communication unit 20, a second communication unit 21, a drive 22, and a power supply unit 23.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the first communication unit 20, the second communication unit 21, the drive 22, and the power supply unit 23 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a photographed image". Data of a photographed image is supplied to the CPU 11, an image processing unit (not illustrated), and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The first communication unit 20 controls communication with an external apparatus (in the present embodiment, the mobile terminal apparatus 2) by way of the wireless communication method (hereinafter, referred to as "first communication method") that is high-speed and adapted for sending and receiving a file. In the present embodiment, the first communication method uses a communication method based on a communication standard of Wi-Fi (Wireless Fidelity) among wireless LAN (Local Area Network).

The second communication unit 21 controls communication with an external apparatus (in the present embodiment, the mobile terminal apparatus 2) by way of the wireless communication method (hereinafter, referred to as "second communication method") which is low-speed but low electric power consumption and adapted for full-time connection. In the present embodiment, the second communication method uses a communication method based on a communication standard of BLE.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 19, as necessary. Similarly to the storage unit 19, the removable medium 31 can also store a variety of data such as the image data stored in the storage unit 19.

The power supply unit 23 is a power supply source that is configured by a lithium ion secondary battery and supplies electric power for driving to the image processing apparatus 1 via a power supply circuit (not illustrated), and supplies electric current as a driving source of the image processing apparatus 1 to each configuration of the image processing apparatus 1. The power supply unit 23 is controlled by the CPU 11, for example, so as to stop supplying electric power to the output unit 18, etc., to turn off display output in a state of the power supply being turned off, to maintain supplying the electric power for the communication of the first communication unit 20 and the second communication unit 21, and send an image even in a state of the power supply being turned off.

Furthermore, the mobile terminal apparatus 2 is configured as a tablet terminal, for example.

It should be noted that the explanations for the hardware configuration are omitted since it is similar to that of the photographing apparatus 1. Hereafter, in a case of employing the hardware of the image processing apparatus 1 and the mobile terminal apparatus 2 for explanations, "-1" is attached to the end of the reference numeral of the image processing apparatus 1 and "-2" is attached to the end of the reference numeral of the mobile terminal apparatus 2. In other words, for the image processing apparatus 1, the hardware is denoted as CPU 11-1 to the removable medium 31-1, and for the mobile terminal apparatus 2, the hardware is denoted as CPU 11-2 to the removable medium 31-2.

The image processing apparatus 1 in the image sending system S configured as above has a function that can change between sent/unsent based on image size and between processed/unprocessed accompanied with a change of image size according to the sending setting of automatic/manual.

FIG. 3 is a view showing corresponding relationships among conditions relating to image sending, sending, and processed/unprocessed, of the present embodiment.

In the present embodiment, as illustrated in FIG. 3, "sent/unsent" and "processed/unprocessed" are determined according to conditions including "way of sending", "image type", and "image size".

In a case of automatic sending, since an image is automatically sent without reflecting a user's intention, in consideration of sending load on an external apparatus, in particular, a moving image having a large image size is not set as a target for sending, and furthermore, an image (moving image/static image) having a relatively large image size is set as a target for processing.

However, in a case in which an image which is a target for sending is a characteristic image, since sending is performed with an original image, processing is not performed. Herein, "characteristic image" refers to an image in which a user's implicit intention is reflected and includes an image including a specific subject in the image (for example, a face, a registered face, and faces), a photographed image under a specific condition (for example, in a specific mode), and a photographed static image during photographing a moving image, for example. Furthermore, "characteristic image" is an image which is a rare and valuable image for a user and includes an image sent in a state in which the number of times of/the total number of times of sending is low, an image sent in a state in which the number of times of sending during a specific period of time is low, and image sent in a state of photographing interval being long, for example. In the image processing apparatus 1, an image itself, a circumstance of photographing an image, a condition during photographing an image are analyzed to specify a characteristic image a result of which processed/unprocessed is determined.

More specifically, the case of "sending method: automatic sending" is as follows.

In the case of "image type: static image" and "image size: more than 3 MB", "sent/unsent: sent" and "processed/unprocessed: processed" are selected. However, in a case of matching the following conditions of "#1: registered face included in image/photographed image under specific condition/static image during photographing moving image/number of times of automatic sending: low", "processed/unprocessed: unprocessed" is selected.

Furthermore, in the case of "image type: static image" and "image size: not more than 3 MB", "sent/unsent: sent" and "processed/unprocessed: unprocessed" are selected.

Furthermore, "image type: moving image" and "image size: more than 100 MB", "sent/unsent: unsent" is selected.

Furthermore, "image type: moving image", "image size: not more than 100 MB", and "image size: more than HD size", "sent/unsent: sent" and "processed/unprocessed: processed" are selected. However, in a case of matching the following conditions of "#2: registered face included in image/photographed image under specific condition/number of times of automatic sending: low", "processed/unprocessed: unprocessed" is selected.

Furthermore, in the case of "image type: moving image", "image size: not more than 100 MB", and "image size: not more than HD size", "sent/unsent: sent" and "processed/unprocessed: unprocessed" are selected.

In a case of manual sending, a user selects an image and, since it is likely that an image which the user considers important is selected as a target for sending, all images are set as targets for sending except for large moving images having an exceptionally large image size and processing is not performed basically.

However, in a case of sending load on an external apparatus being great, since a problem arises in that it is not possible to send an image to an external apparatus, it takes much time to send, etc., in a case of the data volume of sending becoming large resultantly, for example, in a case of there being many images as targets for sending or total data volume of images being large, processing is performed.

More specifically, the case of "sending method: manual sending" is as follows.

In the case of "image type: static image", "sent/unsent: sent" and "processed/unprocessed: unprocessed" are selected. However, in a case of matching the following conditions of "selected number of images/total data volume: large", "processed/unprocessed: processed" is selected.

Furthermore, in the case of "image type: moving image" and "image size: more than 500 MB", "sent/unsent: unsent" is selected.

Furthermore, in the case of "image type: moving image" and "image size: not more than 500 MB", "sent/unsent: sent" and "processed/unprocessed: unprocessed" are selected. However, in a case of matching the following conditions of "selected number of images/total data volume: large", "processed/unprocessed: processed" is elected.

Figure 4:
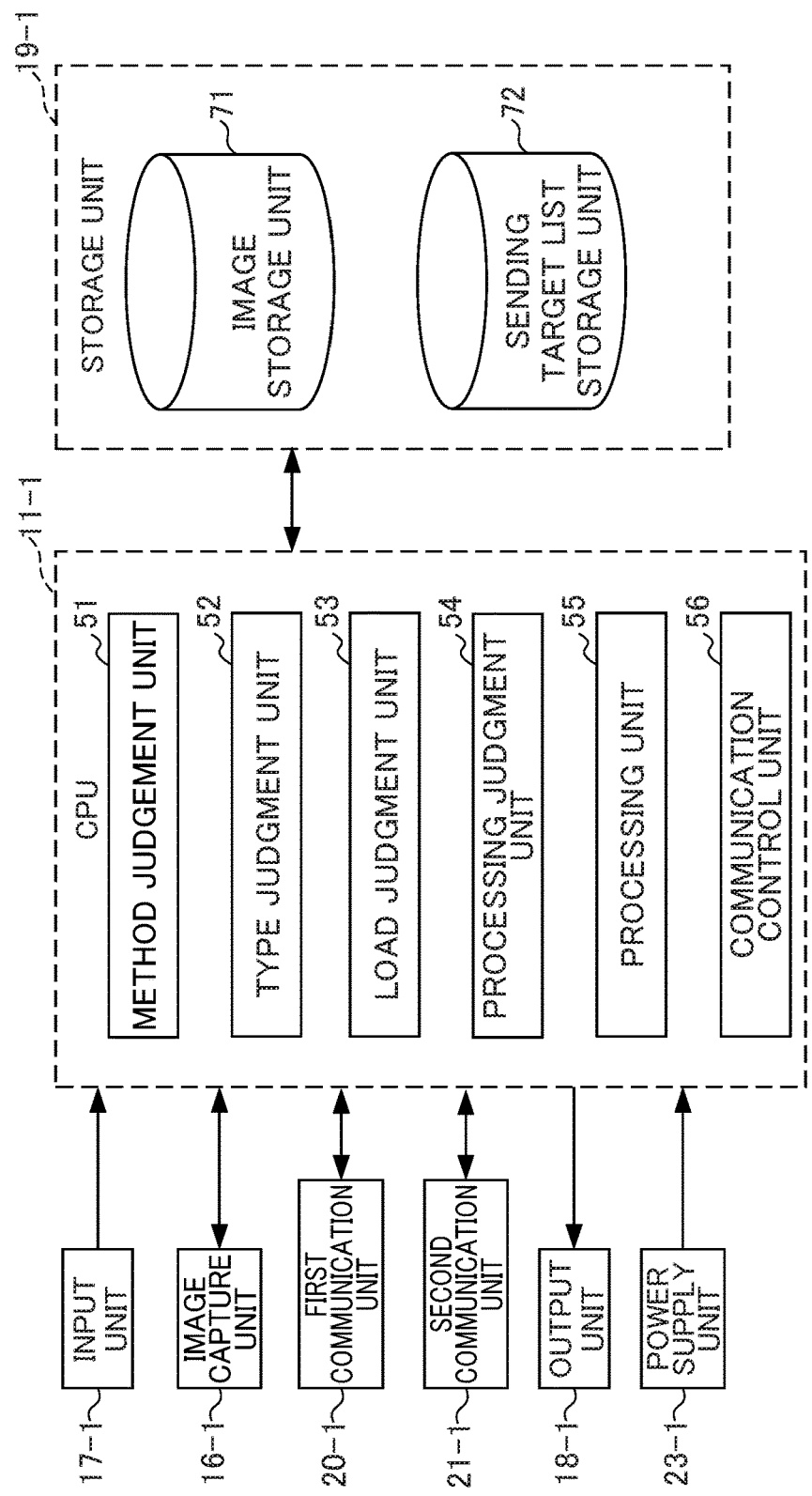
FIG. 4 is a functional block diagram illustrating a functional configuration for executing image sending processing among the functional configurations of the image processing apparatus of FIG. 2.

FIG. 4 is a functional block diagram illustrating a functional configuration for executing image sending processing among the functional configurations of the image processing apparatus 1.

The image sending processing refers to a sequence of processing of sending an appropriate image to an external apparatus (in the present embodiment, the mobile terminal apparatus 2).

In a case of executing the image sending processing, as illustrated in FIG. 4, in a CPU 11-1, a method judgment unit 51, a type judgment unit 52, a load judgment unit 53, a processing judgment unit 54, a processing unit 55, and a communication control unit 56 function.

Furthermore, an image storage unit 71 and a sending target list storage unit 72 are set in one region of a storage unit 19-1.

In the image storage unit 71, data of a photographed image generated by photographing and acquired from the image capture unit 16-1 are stored.

In the sending target list storage unit 72, a sending target list for managing a sending status of a photographed image which is set as a sending target among the photographed images stored in the image storage unit 71 is stored. In the present embodiment, IDs of unsent images are stored in the sending target list as a sending status of images. The sending status of the images is managed by the IDs being deleted from the sending target list when a sending of the images set as targets is completed. In other words, only the IDs of unsent images among the images set as sending targets are stored in the sending target list and IDs of images set as non-sending targets and IDs of sent images among sending targets are not stored.

The method judgment unit 51 judges a method of sending an image to an external apparatus. More specifically, the method judgment unit 51 judges whether sending an image to an external apparatus is automatic or manual.

The type judgement unit 52 judges a type of an image sent to an external apparatus. More specifically, the type judgement unit 52 judges whether an image sent to an external apparatus is a static image or a moving image.

The load judgment unit 53 judges the sending load of an image sent to an external apparatus. More specifically, in a case of an automatic sending, the load judgement unit 53 judges that there is great load when sending an image to an external apparatus in a case in which the image size of a moving image is more than 100 MBytes (megabytes). On the other hand, in a case of a manual sending, the load judgment unit 53 judges that there is great load when sending an image to an external apparatus in a case in which the image size of a moving image is more than 500 MBytes.

The processing judgement unit 54 judges whether it is necessary to process an image sent to an external apparatus. More specifically, in automatic sending, the processing judgement unit 54 judges that it is necessary to process an image sent to an external apparatus in a case in which a static image is more than 3 Mbytes (20481536 pixel). On the other hand, in manual sending, the processing judgement unit 54 judges that it is necessary to process an image sent to an external apparatus in a case in which a moving image is more than an HD size (1280×720 pixel).

Furthermore, even when the processing judgment unit 54 judged that it is unnecessary to perform processing, in a case of manual sending and in a case in which the selected number of images is many and total volume of data is large, for example, the processing judgment unit 54 judges that it is necessary to perform processing. Furthermore, even when the processing judgment unit 54 judged that it is necessary to perform processing, in a case of automatic sending and in a case in which a specific subject (for example, registered face in advance) is included in an image, an image is a photographed static image during a moving image, a photographed image is under a specific condition (for example, specific mode), or a number of times of sending is low, the processing judgment unit 54 judges that it is unnecessary to perform processing.

The processing unit 55 processes an image sent to an external apparatus. More specifically, the processing unit 55 resizes the image size of a static image to 3 Mbytes (20481536 pixel) or transcodes a moving image to an HD size (1280×720 pixel).

The communication control unit 56 controls the first communication unit 20-1 to send an image to an external apparatus. More specifically, the communication control unit 56 controls the first communication unit 20-1 to send a static image and a static image/moving image in a case of the moving image being not more than a predetermined volume.

Next, operations will be described.

Since the abovementioned automatic sending processing using a sending target list can be realized using a publicly known technology, detailed descriptions thereof will be omitted herein.

Image Sending Processing

Figure 5:
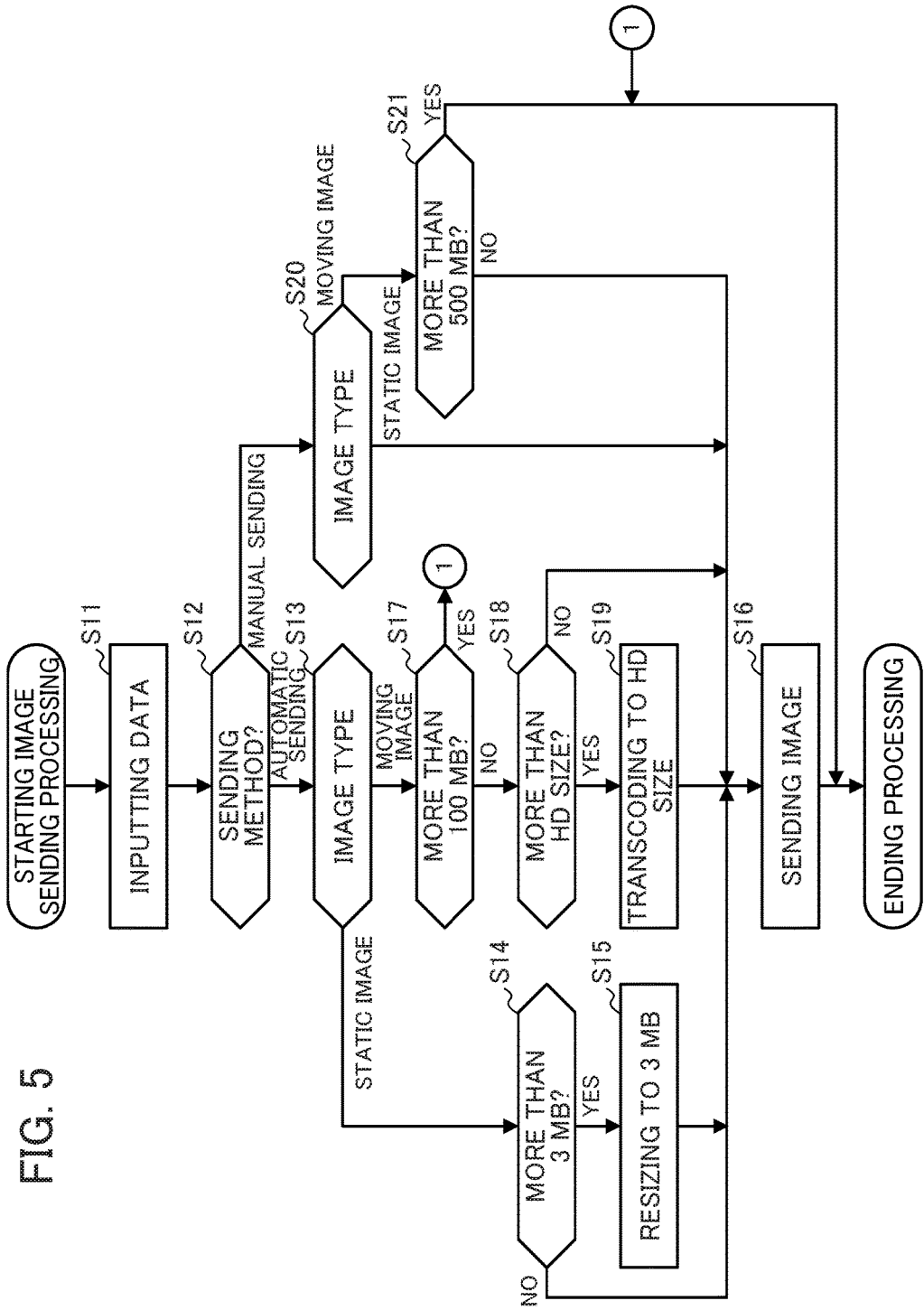
FIG. 5 is a flowchart illustrating a flow of image sending processing executed by the image processing apparatus of FIG. 2 having the functional configuration of FIG. 4.

FIG. 5 is a flowchart illustrating a flow of image sending processing executed by the image processing apparatus 1 of FIG. 2 having the functional configuration of FIG. 4. The image sending processing starts by a user's operation to start image sending processing on the input unit 17-1.

In a case of a static image of which the size is more than 3 Mbytes being inputted as a target for the image sending processing by way of automatic sending (Step S11), the method judgment unit 51 judges that the sending an image to an external apparatus is automatic (Step S12: automatic sending), and the type judgment unit 52 judges that the image sent to the external apparatus is a static image (Step S13: static image), and when the processing judgment unit 54 judges that it is necessary to process the image sent to the external apparatus, i.e. when the processing judgment unit 54 judges that the image size is more than 3 Mbytes (20481536 pixel) (Step S14: YES), the processing unit 55 performs processing to resize the image sent to the external apparatus to 3 Mbytes (20481536 pixel) (Step S15), and the communication control unit 56 controls the first communication unit 20-1 to send the image (Step S16). Then, the processing ends.

In a case of a static image of which the size is no more than 3 Mbytes being inputted as a target for the image sending processing by way of automatic sending (Step S11), the method judgment unit 51 judges that the sending an image to an external apparatus is automatic (Step S12: automatic sending), and the type judgment unit 52 judges that the image sent to the external apparatus is a static image (Step S13: static image), and when the processing judgment unit 54 judges that it is unnecessary to process the image sent to the external apparatus, i.e., when the processing judgment unit 54 judges that the image size is no more than 3 Mbytes (Step S14: NO), the processing unit 55 does not perform processing on the image sent to the external apparatus, and the communication control unit 56 controls the first communication unit 20-1 to send the image (Step S16). Then, the processing ends.

In a case of a moving image of which the size is no more than 100 Mbytes but more than the HD size being inputted as a target for the image sending processing by way of automatic sending (Step S11), the method judgment unit 51 judges that the sending an image to an external apparatus is automatic (Step S12: automatic sending), and the type judgment unit 52 judges that the image sent to the external apparatus is a moving image (Step S13: moving image), the load judgement unit 53 judges that the sending load of the moving image sent to the external apparatus is small, i.e. the load judgement unit 53 judges that the image size is not more than 100 Mbytes (Step S17: NO), and when the processing judgment unit 54 judges that it is necessary to process the image sent to the external apparatus, i.e. when the processing judgment unit 54 judges that the image size is more than an HD size (1280×720 pixel) (Step S18: YES), the processing unit 55 performs processing to resize the image sent to the external apparatus to an HD size (1280× 720 pixel) (Step S19), and the communication control unit 56 controls the first communication unit 20-1 to send the image (Step S16). Then, the processing ends.

In a case of a moving image of which the size is no more than 100 Mbytes and not more than an HD size being inputted as a target for the image sending processing by way of automatic sending (Step S11), the method judgment unit 51 judges that the sending an image to an external apparatus is automatic (Step S12: automatic sending), the type judgment unit 52 judges that the image sent to the external apparatus is a moving image (Step S13: moving image), and the load judgement unit 53 judges that the sending load of the moving image sent to the external apparatus is small, i.e. the load judgement unit 53 judges that the image size is not more than 100 Mbytes (Step S17: NO), and when the processing judgment unit 54 judges that it is unnecessary to process the image sent to the external apparatus, i.e. when the processing judgment unit 54 judges that the image size is no more than an HD size (1280×720 pixel) (Step S18: NO), the processing unit 55 does not perform processing on the image sent to the external apparatus, and the communication control unit 56 controls the first communication unit 20-1 to send the image (Step S16). Then, the processing ends.

In a case of a moving image of which the size is more than 100 Mbytes being inputted as a target for the image sending processing by way of automatic sending (Step S11), the method judgment unit 51 judges that the sending an image to an external apparatus is automatic (Step S12: automatic sending), the type judgment unit 52 judges that the image sent to the external apparatus is a moving image (Step S13: moving image), the load judgement unit 53 judges that the sending load of the moving image sent to the external apparatus is great, i.e., the load judgement unit 53 judges that the image size is more than 100 Mbytes (Step S17: YES), and the communication control unit 56 does not control the first communication unit 20-1 to send the image. Then, the processing ends.

In a case of a static image being inputted as a target for the image sending processing by way of manual sending (Step S11), the method judgment unit 51 judges that the sending an image to an external apparatus is manual (Step S12: manual sending), the type judgment unit 52 judges that the image sent to the external apparatus is a static image (Step S20: static image), the processing unit 55 does not perform processing on the image sent to the external apparatus, and the communication control unit 56 controls the first communication unit 20-1 to send the image (Step S16). Then, the processing ends.

In a case of a moving image of which the size is no more than 500 Mbytes being inputted as a target for the image sending processing by way of manual sending (Step S11), the method judgment unit 51 judges that the sending an image to an external apparatus is manual (Step S12: manual sending), the type judgment unit 52 judges that the image sent to the external apparatus is a moving image (Step S20: moving image), and when the load judgment unit 53 judges that the image size of the moving image sent to the external apparatus is no more than a predetermined size, i.e. when the load judgment unit 53 judges that the image size is not more than 500 Mbytes (Step S21: NO), the processing unit 55 does not perform processing on the image sent to the external apparatus, and the communication control unit 56 controls the first communication unit 20-1 to send the image (Step S16). Then, the processing ends.

In a case of a moving image of which the size is more than 500 Mbytes being inputted as a target for the image sending processing by way of manual sending (Step S11), the method judgment unit 51 judges that the sending an image to an external apparatus is manual (Step S12: manual sending), the type judgment unit 52 judges that the image sent to the external apparatus is a moving image (Step S20: moving image), and when the load judgment unit 53 judges that the image size of the moving image sent to the external apparatus is more than a predetermined size, i.e. when the load judgment unit 53 judges that the image size is more than 500 Mbytes (Step S21: YES), the communication control unit 56 does not control the first communication unit 20-1 to send the image. Then, the processing ends.

In addition, in the abovementioned embodiment, it can be configured so that, after having judged processed/unprocessed of an image based on an image size, in a case of further matching the processing change condition illustrated in FIG. 3, the processing judgment unit 54 judges processed/unprocessed finally or the processing judgment unit 54 judges the matching of the processing change condition first and, in a case of matching, then judges processed/unprocessed of the image unconditionally.

Therefore, in the image processing apparatus 1, an upper limit volume within which sending a moving image is permitted is provided to automatic sending and manual sending, respectively, and thus a moving image which exceeds the upper limit is not sent. Furthermore, an upper limit image size within which sending is permitted is provided to automatic sending and manual sending and a static image and a moving image, respectively, and thus an image which exceeds the upper limit image size is not sent or is resized to send. Furthermore, in a case of analyzing a characteristic of an image and matching a condition, sent/unsent or processed/unprocessed is changed preferentially.

Therefore, in the image processing apparatus 1, since an image having a large image size (static image, moving image) is not sent, it is not likely to stress the memory capacity of an external apparatus at a destination. Furthermore, since an image having a large image size (static image, moving image) is not sent, it is not likely to exhaust the battery due to a long communication time. Furthermore, in the image processing apparatus 1, since an original image (photographed image) is stored in the image storage unit 71, it may be configured so that, even when an image is processed by giving priority to sending to an external apparatus, the image is acquired by the external apparatus when it becomes unnecessary to take into account the sending in a case of an original image being required.

The image processing apparatus 1 configured as above sends an image to an external apparatus.

Furthermore, the image processing apparatus 1 includes the communication control unit 56, the processing unit 55, and the processing judgment unit 54.

The communication control unit 56, when an image is photographed by an image capture unit, controls the first communication unit 20-1 to automatically send the photographed image to an external apparatus.

The communication control unit 56, controls the first communication unit 20-1 to manually send the photographed image which is stored and is selected by a user to an external apparatus.

The processing unit 55 processes an image.

The processing judgement unit 54, when sending an image to an external apparatus, performs control to process an image sent to the processing unit 55 based on whether sending the image is automatic sending of the first communication unit 20-1 controlled by the communication control unit 56 or manual sending of the first communication unit 20-1 controlled by the communication control unit 56.

Therefore, in the image processing apparatus 1, since it is possible to send a processed image depending on the automatic sending and the manual sending, separately, it is possible to send an appropriate image to an external apparatus.

The processing judgement unit 54 sets a predetermined threshold which differs between automatic sending and manual sending based on a priority level according to whether sending an image is the automatic sending or the manual sending, and in a case of the image sent having been judged as exceeding the predetermined threshold, the processing judgment unit 54 performs control to process an image sent to the processing unit 55.

Therefore, in the image processing apparatus 1, it is possible to provide a priority level according to whether sending an image is automatic sending or manual sending, and thus it is possible to send an appropriate image to an external apparatus depending on the automatic sending and manual sending.

The processing judgment unit 54 sets a predetermined threshold of the manual sending as a higher value than a predetermined threshold of the automatic sending, with the manual sending being set as a higher priority level than the automatic sending.

Therefore, in the image processing apparatus 1, it is possible to set the priority level in a simple configuration.

The processing judgment unit 54 performs judgment as to whether exceeding a predetermined threshold according to a size of an image to be sent.

Therefore, in the image processing apparatus 1, it is possible to send an appropriate image to an external apparatus depending on a priority level according to an image size to be sent.

Furthermore, the image processing apparatus 1 further includes the type judgment unit 52.

The type judgement unit 52 acquires the type of an image to be sent.

The processing judgment unit 54 further takes into consideration the type of the image acquired by the type judgement unit 52 and performs control to process the image sent to the processing unit 55.

Therefore, in the image processing apparatus 1, it is possible to send an appropriate image to an external apparatus depending on the type of an image.

Furthermore, the image processing apparatus 1 further includes the load judgment unit 53.

The load judgment unit 53 acquires the data volume of an image to be sent.

The processing judgment unit 54 further takes into consideration the data volume of the image to be sent acquired by the load judgment unit 53 and performs control to process the image to be sent to the processing unit 55.

Therefore, in the image processing apparatus 1, it is possible to take into consideration the data volume of an image to be sent and to send an appropriate image to an external apparatus.

The load judgment unit 53 judges a load caused by sending an image to be sent to an external apparatus.

The communication control unit 56 sets a predetermined threshold which is judged as a load being great by the load judgment unit 53 and, in a case of the load judged having been judged as exceeding the predetermined threshold, performs control on the first communication unit 20-1 to limit sending an image to the external apparatus.

Therefore, in the image processing apparatus 1, it is possible to take into consideration the load caused by sending to an external apparatus and to control sent/unsent of an image.

Furthermore, the image processing apparatus 1 sends a photographed image by an image capture unit 16 to an external apparatus.

Furthermore, the image processing apparatus 1 includes the processing judgment unit 54 and the processing unit 55.

The processing unit 55 processes an image.

The processing judgment unit 54 acquires a characteristic of an image to be sent to an external apparatus.

Furthermore, the processing judgment unit 54, when the first communication unit 20-1 sending an image to an external apparatus, performs control to process an image to be sent to the processing unit 55 based on the characteristic of the image thus acquired.

Therefore, in the image processing apparatus 1, since processed/unprocessed is controlled according to the characteristic of the image, it is possible to send an appropriate image to an external apparatus.

The processing judgment unit 54 sets a different predetermined threshold based on a characteristic of an image acquired and, in a case of the image to be sent having been judged as exceeding the predetermined threshold, the processing judgment unit 54 performs control to process the image sent to the processing unit 55.

Therefore, in the image processing apparatus 1, it is possible to send an appropriate image to an external apparatus according to a characteristic of an image.

The processing judgment unit 54 acquires one or both the type of a subject included in an image to be sent and the condition under which an image to be sent was photographed, as a characteristic of an image.

The processing judgement unit 54 sets a predetermined threshold to be higher in one or both cases among being a case in which a subject included in an image to be sent is a specific subject and the case of the condition under which an image to be sent was photographed, as a characteristic acquired by the processing judgment unit 54.

Therefore, in the image processing apparatus 1, it is possible to send an appropriate image to an external apparatus according to the type of a subject or the condition under which an image was photographed.

Furthermore, the image processing apparatus 1 further includes the method judgment unit 51.

The method judgment unit 51 acquires a method of sending a photographed image by an image capture unit 16 to an external apparatus.

The processing judgment unit 54 further takes into consideration the sending method acquired by the method judgment unit 51 and sets a different predetermined threshold.

Therefore, in the image processing apparatus 1, it is possible to take into consideration the sending method and to send an appropriate image to an external apparatus.

The method judgment unit 51, when an image is photographed by an image capture unit, acquires whether sending by the first communication unit 20-1 is automatic sending that automatically sends a photographed image to an external apparatus or manual sending that manually sends the photographed image to the external apparatus by a user selecting a stored image.

The processing judgment unit 54 sets a predetermined threshold to be higher in the case in which the sending method acquired by the method judgment unit 51 is manual sending than the case in which the sending method acquired by the method judgment unit 51 is automatic sending.

Therefore, in the image processing apparatus 1, it is possible to send an appropriate image to an external apparatus depending on the sending method including the automatic sending and the manual sending.

The processing unit 55 performs processing to reduce an image size.

Therefore, in the image processing apparatus 1, it is possible to send an appropriate image to an external apparatus by reducing an image size.

It should be noted that the present invention is not to be limited to the aforementioned embodiment, and that modifications, improvements, etc. within a scope that can achieve the objects of the present invention are also included in the present invention.

In the abovementioned embodiment, it is possible to add a group image (images by continuously shooting) in addition to a static image and a moving image as a type of an image.

Furthermore, in the abovementioned embodiment, it is configured so that an image is processed actively since the sending is performed regardless of a user's intention in a case of the automatic sending. However, the present invention is not limited thereto. It can be configured so as not to actively process an image on which a user's intention has been reflected. For example, it can be configured so as not to process an image in a case of including a specific subject in an image such as a case of a specific face (for example, registered face) being included among the faces recognized in the image or in a case of a static image photographed during photographing a moving image. Furthermore, it can be configured so as not to process an image in a case of the number of times of the automatic sending is low.

Furthermore, in the abovementioned embodiment, it is configured so as not to actively process an image since the sending is performed by a user selecting an image according to the user's will in a case of the manual sending. However, the present invention is not limited thereto. For example, in a case of the selected number of images (or total data volume of an image selected) being large, it can be configured so as to process an image by giving priority to the image selected being viewable over the image quality.

Furthermore, in the abovementioned embodiment, although it is configured to process an image by resizing, it is acceptable so long as the data volume of an image can be reduced, and thus it may be configured so as to process an image by increasing a compression rate of an image or reducing the image.

In the aforementioned embodiment, explanations are provided with the example of the image processing apparatus 1 to which the present invention is applied being a digital camera; however, the present invention is not limited thereto in particular.

For example, the present invention can be applied to any electronic device in general having image sending processing function. More specifically, for example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configurations of FIG. 4 are merely illustrative examples, and the present invention is not particularly limited thereto. More specifically, the types of functional blocks employed to realize the above-described functions are not particularly limited to the examples shown in FIG. 4, so long as the image processing apparatus 1 can be provided with the functions enabling the aforementioned processing sequence to be executed in its entirety.

A single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, the program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 of FIG. 2 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, ROM of FIG. 2 in which the program is recorded or a hard disk, etc. included in the storage unit 19 of FIG. 2.

It should be noted that, in the present specification, the steps defining the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus that sends an image to an external apparatus, the image processing apparatus comprising:
    a processor that:
        controls a communication section to automatically send a photographed image to an external apparatus when the image is photographed by an image capture section,
        controls the communication section to manually send a photographed image which is stored and is selected by a user, to an external apparatus, and
        processes, when an image is to be sent to the external apparatus, the image to be sent based on whether sending of the image to be sent is by the automatic sending or the manual sending.

2. The image processing apparatus according to claim 1, wherein the processor sets a predetermined threshold which differs between the automatic sending and the manual sending based on a priority level according to whether the sending of the image to be sent is by the automatic sending or the manual sending, and in a case of the image to be sent having been judged as exceeding the predetermined threshold, controls to process the image to be sent.

3. The image processing apparatus according to claim 2, wherein the processor sets the predetermined threshold to have a higher value for the manual sending than for the automatic sending, with the manual sending being set as a higher priority level than the automatic sending.

4. The image processing apparatus according to claim 2, wherein the processor performs judgment as to whether the predetermined threshold is exceeded according to a size of the image to be sent.

5. The image processing apparatus according to claim 2, wherein the processor further acquires a type of the image to be sent, and takes into consideration the type having been acquired when processing the image to be sent.

6. The image processing apparatus according to claim 1, wherein the processor further acquires a data volume of the image to be sent, and takes into consideration the data volume having been acquired when processing the image to be sent.

7. The image processing apparatus according to claim 2, wherein the processor further judges a load that will be caused by sending the image to be sent to the external apparatus, and sets the predetermined threshold to a value corresponding to a load judged to be large and, in a case of the load judged having been judged as exceeding the predetermined threshold, controls the communication section to limit sending the image to be sent to the external apparatus.

8. An image processing apparatus that sends an image photographed by an image capture section to an external apparatus, the image processing apparatus comprising:
    a processor that:
        acquires at least one of a characteristic and a size of an image to be sent to the external apparatus, and
        when the image to be sent is to be sent to the external apparatus via a communication section, compares the at least one of the characteristic and the size of the image to be sent having been acquired to judgment criteria held in advance by the image processing apparatus itself, and processes the image to be sent based on a result of the comparison.

9. The image processing apparatus according to claim 8, wherein the processor sets a different predetermined threshold for each of the characteristic of the image to be sent and the size of the image to be sent and, in a case of the image to be sent having been judged as exceeding the predetermined threshold, processes the image to be sent.

10. The image processing apparatus according to claim 9, wherein the processor acquires at least one of (i) a type of a subject included in the image to be sent and (ii) a condition under which the image to be sent was photographed, as the characteristic of the image to be sent, and sets the predetermined threshold for the characteristic of the image to be sent to be higher in at least one of cases in which (i) the subject included in the image to be sent is a specific subject and (ii) the condition under which the image to be sent was photographed is a predetermined condition.

11. The image processing apparatus according to claim 9, wherein the processor further acquires a sending method by which an image photographed by the image capture section is to be sent to the external apparatus, and sets the predetermined threshold in consideration of the sending method having been acquired.

12. The image processing apparatus according to claim 11, wherein the processor, when an image is photographed by the image capture section, determines whether the sending method having been acquired is (i) automatic sending by which a photographed image is automatically sent to the external apparatus or (ii) manual sending by which a user manually sends a photographed image to the external apparatus by the user selecting a stored image, and sets the predetermined threshold to be higher in a case in which the sending method is determined to be manual sending than in a case in which the sending method is determined to be automatic sending.

13. The image processing apparatus according to claim 1, wherein the processor performs processing to reduce a size of the image to be sent.

14. An image processing method executed by an image processing apparatus that sends an image photographed by an image capture section to an external apparatus, the method comprising:
    a first sending processing of controlling a communication section to automatically send a photographed image to an external apparatus when the image is photographed by the image capture section;
    a second sending processing of controlling a communication section to manually send a photographed image which is stored and is selected by a user, to an external apparatus; and
    image processing of, when a communication section is to send an image to be sent to the external apparatus, processing the image to be sent based on whether sending of the image to be sent is by automatic sending in the first sending processing or manual sending in the second sending processing.

15. An image processing method executed by an image processing apparatus that sends an image photographed by an image capture section to an external apparatus, the method comprising:
   characteristic acquisition processing of acquiring at least one of a characteristic and a size of an image to be sent to the external apparatus; and
   image processing of, when the image to be sent is to be sent to the external apparatus via a communication section, comparing the at least one of the characteristic and the size of the image to be sent acquired in the characteristic acquisition processing to judgement criteria held in advance by the image processing apparatus itself, and processing the image to be sent based on a result of the comparing.

16. The image processing apparatus according to claim 8, wherein the processor performs processing to reduce a size of the image to be sent.

* * * * *